US008437288B2

(12) United States Patent
Edge et al.

(10) Patent No.: US 8,437,288 B2
(45) Date of Patent: May 7, 2013

(54) NETWORK SELECTION BY WIRELESS TERMINALS

(75) Inventors: Stephen W. Edge, Escondido, CA (US); David Williams, Malaga (ES); Niels Peter Skov Andersen, Roskilde (DK)

(73) Assignee: QUALCOMM Incorporated, San Diego, CA (US)

( * ) Notice: Subject to any disclaimer, the term of this patent is extended or adjusted under 35 U.S.C. 154(b) by 898 days.

(21) Appl. No.: 11/682,858

(22) Filed: Mar. 6, 2007

(65) Prior Publication Data

US 2007/0275717 A1    Nov. 29, 2007

Related U.S. Application Data

(60) Provisional application No. 60/780,391, filed on Mar. 7, 2006.

(51) Int. Cl.
*H04W 4/00* (2009.01)

(52) U.S. Cl.
USPC .......................................................... 370/328

(58) Field of Classification Search ........................ None
See application file for complete search history.

(56) References Cited

U.S. PATENT DOCUMENTS

| 5,517,677 | A  | * | 5/1996 | Moon ........................... 455/161.1 |
| 6,256,497 | B1 | * | 7/2001 | Chambers ....................... 455/433 |
| 6,259,917 | B1 | * | 7/2001 | Elzein ........................ 455/435.2 |
| 6,272,315 | B1 | * | 8/2001 | Chang et al. .................. 455/13.1 |
| 6,400,961 | B1 |   | 6/2002 | Lillie et al. |
| 6,510,318 | B1 | * | 1/2003 | Minagawa .................. 455/435.2 |
| 6,584,316 | B1 | * | 6/2003 | Akhteruzzaman et al. ... 455/445 |
| 6,603,755 | B1 | * | 8/2003 | Parker ........................... 370/342 |
| 6,748,217 | B1 | * | 6/2004 | Hunzinger et al. ......... 455/435.2 |
| 6,748,246 | B1 | * | 6/2004 | Khullar .......................... 455/574 |
| 7,069,026 | B2 | * | 6/2006 | McClure .................... 455/456.3 |
| 7,369,861 | B2 | * | 5/2008 | Vare ........................... 455/456.2 |

(Continued)

FOREIGN PATENT DOCUMENTS

| GB | 2405556 A1 | 3/2005 |
| JP | 2002503913 A | 2/2002 |

(Continued)

OTHER PUBLICATIONS

International Search Report and Written Opinion—PCT/US2007/063497, International Search Authority—European Patent Office—Aug. 20, 2007.

(Continued)

*Primary Examiner* — Min Jung
(74) *Attorney, Agent, or Firm* — D. Scott Juneau (57) ABSTRACT

Techniques for efficiently performing network selection using information stored at a terminal are described herein. The terminal may store coverage information for previously detected wireless networks, cell information for previously detected cells in wireless networks, usage information for previously accessed wireless networks, availability information for previously detected wireless networks, almanac information for cells in wireless networks (e.g., information on cells available at different locations and information for acquiring the cells), and/or other information that may be useful for network selection. The terminal may select a wireless network to attempt acquisition based on the stored coverage information and its current location, the stored cell information and information for the current location (e.g., an identity of a cell detected at the current location), the stored usage information, the stored availability information, and/or the stored almanac information.

58 Claims, 6 Drawing Sheets

U.S. PATENT DOCUMENTS

| | | | |
|---|---|---|---|
| 7,657,282 B2 * | 2/2010 | Suzuki et al. | 455/552.1 |
| 2001/0049738 A1 | 12/2001 | Doi | |
| 2002/0102974 A1 | 8/2002 | Raith | |
| 2003/0003922 A1 | 1/2003 | McClure | |
| 2003/0003933 A1 * | 1/2003 | Deshpande et al. | 455/510 |
| 2003/0148786 A1 * | 8/2003 | Cooper et al. | 455/552 |
| 2003/0162535 A1 | 8/2003 | Nishiyama et al. | |
| 2003/0193910 A1 * | 10/2003 | Shoaib et al. | 370/331 |
| 2004/0072581 A1 | 4/2004 | Tajima et al. | |
| 2004/0162090 A1 * | 8/2004 | Suryanarayana et al. | 455/456.5 |
| 2005/0043046 A1 * | 2/2005 | Lee | 455/502 |
| 2005/0221844 A1 * | 10/2005 | Trethewey et al. | 455/456.6 |
| 2005/0250496 A1 * | 11/2005 | Hason et al. | 455/436 |
| 2005/0288054 A1 | 12/2005 | Sakaniwa | |
| 2006/0126562 A1 * | 6/2006 | Liu | 370/331 |
| 2006/0262800 A1 * | 11/2006 | Martinez et al. | 370/395.52 |
| 2006/0268711 A1 * | 11/2006 | Doradla et al. | 370/235 |
| 2007/0025293 A1 * | 2/2007 | Choi | 370/331 |
| 2007/0135159 A1 * | 6/2007 | Sinivaara | 455/552.1 |
| 2007/0253395 A1 * | 11/2007 | Graves et al. | 370/338 |
| 2008/0019304 A1 * | 1/2008 | Buckley et al. | 370/328 |
| 2009/0029712 A1 * | 1/2009 | Marjelund et al. | 455/450 |
| 2009/0156271 A1 * | 6/2009 | Islam et al. | 455/574 |
| 2010/0075707 A1 * | 3/2010 | Fritsch et al. | 455/517 |
| 2010/0211993 A1 * | 8/2010 | Islam et al. | 726/3 |
| 2010/0323674 A1 * | 12/2010 | Zhu et al. | 455/414.1 |

FOREIGN PATENT DOCUMENTS

| | | |
|---|---|---|
| JP | 2003259433 A | 9/2003 |
| JP | 2004096378 A | 3/2004 |
| JP | 2004140459 A | 5/2004 |
| JP | 2004221730 A | 8/2004 |
| JP | 2004297480 A | 10/2004 |
| JP | 2005020198 A | 1/2005 |
| JP | 2005079819 A | 3/2005 |
| JP | 2005080071 A | 3/2005 |
| JP | 2006042313 A | 2/2006 |
| JP | 2006504286 | 2/2006 |
| RU | 2160975 C2 | 12/2000 |
| RU | 20040131557 | 5/2005 |
| WO | WO9941854 A1 | 8/1999 |
| WO | 0008883 A1 | 2/2000 |
| WO | 0150788 A1 | 7/2001 |
| WO | WO03061327 | 7/2003 |
| WO | 03105501 A1 | 12/2003 |
| WO | WO2005002248 A1 | 1/2005 |

OTHER PUBLICATIONS

Taiwan Search Report—TW096107902—TIPO—Mar. 16, 2012.

* cited by examiner

NETWORK SELECTION BY WIRELESS TERMINALS

CLAIM OF PRIORITY UNDER 35 U.S.C. §119

The present Application for Patent claims priority to Provisional Application Ser. No. 60/780,391, entitled "NETWORK SELECTION BY WIRELESS TERMINALS," filed Mar. 7, 2006, assigned to the assignee hereof, and expressly incorporated herein by reference.

BACKGROUND

I. Field

The present disclosure relates generally to communication, and more specifically to techniques for selecting a wireless communication network for acquisition by a wireless terminal.

II. Background

Wireless communication networks are networks with wireless capabilities that enable wireless terminals to communicate without the use of cables or wires. Wireless networks are widely deployed to provide various communication services such as voice, video, packet data, messaging, broadcast, etc. These wireless networks may be wireless wide area networks (WWANs) such as cellular networks, wireless metropolitan area networks (WMANs), and wireless local area networks (WLANs).

A wireless terminal (e.g., a cellular phone) may be able to receive service from one or more wireless networks. Upon power up, the terminal may search for a wireless network that is within range and from which the terminal may receive service. If such a wireless network is found, then the terminal may acquire the wireless network and attempt to register with the wireless network. During registration, the terminal may be authenticated and authorized for a requested service by the wireless network or possibly by a home network if the user is roaming. The terminal may then communicate with the wireless network to obtain the desired service, e.g., to originate or receive calls, to access email, to obtain Internet services, etc.

The terminal may not have any knowledge of its operating environment when it is first powered on and may not know which wireless networks, if any, can be acquired. Furthermore, the terminal may have a list of preferred networks whose selection by the terminal is preferred when the home network is not available, e.g., when the user is roaming or is temporarily not within the coverage of the home network. The wireless networks in the preferred list may be selected based on business arrangements between the home network operator and other network operators, service offering, reliability and performance considerations, preferential tariffs, security and privacy considerations, etc.

At power up, the terminal may be within the coverage of zero or more wireless networks, which may or may not be in the preferred list. In this case, the terminal may search for an extended period of time in order to look for one of the preferred networks. The search may be more complex if the terminal supports multiple radio technologies and/or multiple frequency bands, since there may be more combination of radio technology and frequency band to search. During this search time, the user may not be able to originate or receive services such as voice calls, email, and short messages.

There is therefore a need in the art for techniques that allow a terminal to reduce the amount of time to acquire a wireless network, especially when the terminal has little or no prior knowledge of which networks may be available.

SUMMARY

Techniques for efficiently performing network selection using information stored at a terminal are described herein. According to an aspect, an apparatus is described which includes a memory that stores coverage information for previously detected wireless networks and a processor that selects a wireless network to attempt acquisition based on the stored coverage information. The coverage information may be given in various formats, as described below.

According to another aspect, an apparatus is described which includes a memory that stores information for previously detected cells in wireless networks and a processor that obtains information for current location of a terminal and selects a wireless network to attempt acquisition based on the information for the current location and the stored information for the previously detected cells.

According to yet another aspect, an apparatus is described which includes a memory that stores usage information for previously accessed wireless networks and a processor that selects a wireless network to attempt acquisition based on the stored usage information.

According to yet another aspect, an apparatus is described which includes a memory that stores availability information for previously detected wireless networks and a processor that selects a wireless network to attempt acquisition based on the stored availability information.

According to yet another aspect, an apparatus is described which includes a memory that stores almanac information for cells in wireless networks and a processor that selects a wireless network to attempt acquisition based on the almanac information. The almanac information may comprise information on cells available at different locations and information for acquiring the cells.

Various aspects and features of the disclosure are described in further detail below.

DETAILED DESCRIPTION

Figure 1:
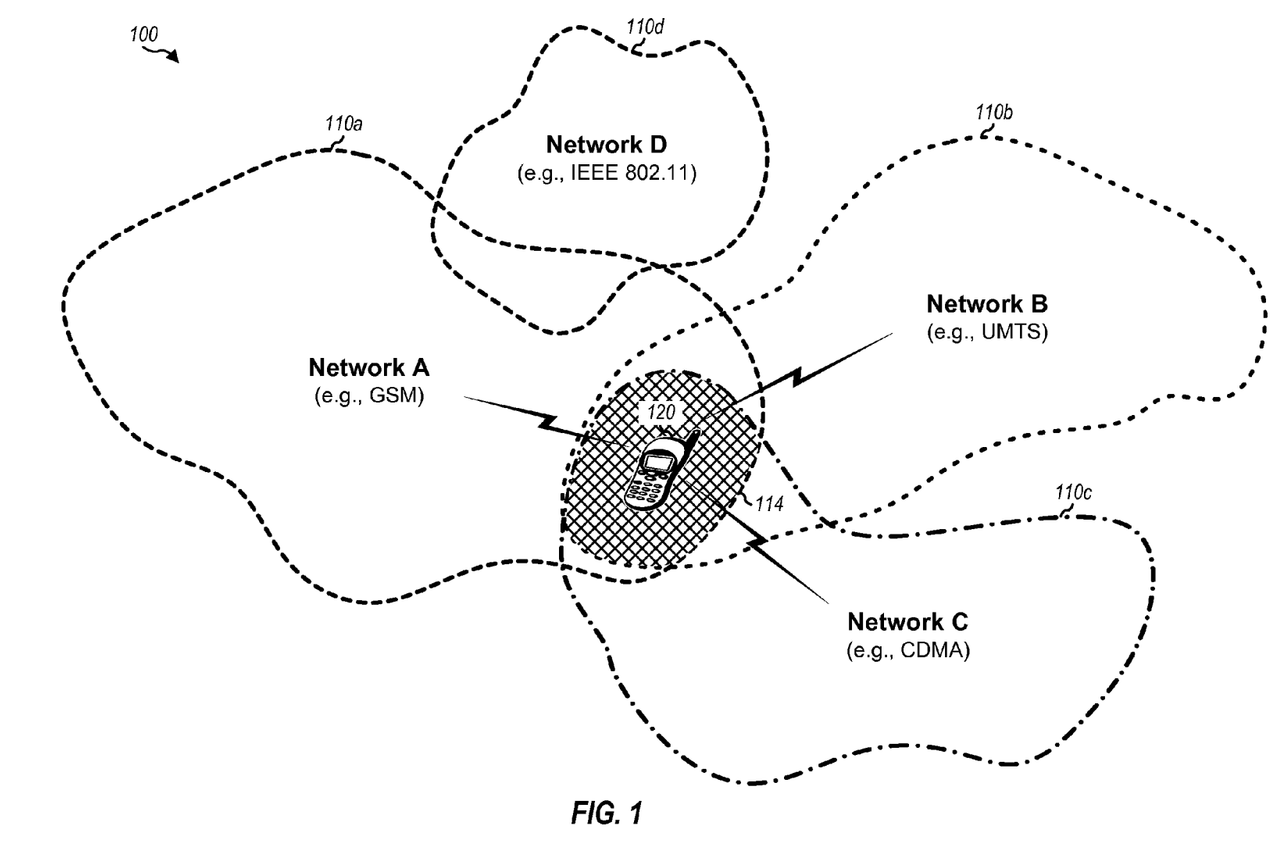
FIG. 1 shows an environment with multiple wireless networks.

FIG. 1 shows an example network environment 100 in which multiple wireless networks may be present. In this example, four wireless networks 110a, 110b, 110c and 110d are present and are denoted as networks A, B, C and D, respectively. In general, each wireless network may have any coverage area, and the coverage areas of some or all wireless networks may overlap. In the example shown in FIG. 1, wireless networks A, B and C overlap in area 114, which is shown with cross hashing.

In general, each wireless network 110 may implement any radio technology such as Global System for Mobile Communications (GSM), Wideband-CDMA (W-CDMA), Long Term Evolution (LTE), CDMA2000 1X, High Rate Packet Data (HRPD), IEEE 802.16, IEEE 802.20, IEEE 802.11, Hiperlan, Flash-OFDM®, etc. GSM, W-CDMA, LTE, CDMA2000 1X, HRPD, and Flash-OFDM® are radio technologies for WWANs. W-CDMA is part of Universal Mobile Telecommunication System (UMTS). CDMA2000 1X and HRPD are part of cdma2000, which is also referred to as Code Division Multiple Access (CDMA). IEEE 802.16 and IEEE 802.20 are two families of standards from The Institute of Electrical and Electronics Engineers (IEEE) for WMANs, with IEEE 802.16 being commonly referred to as WiMAX. IEEE 802.11 is another family of standards from the IEEE for WLANs and is commonly referred to as Wi-Fi. Hiperlan is another radio technology for WLANs. These various radio technologies are known in the art.

In general, a wireless network may implement one or more radio technologies. For simplicity, the following description assumes that each wireless network implements one radio technology, even though multiple wireless networks of different radio technologies may be assigned the same network identifier and/or may be supported by a common set of base stations and/or by other common network elements. In an example that is used in some of the description below, network 110a is a GSM network, network 110b is a UMTS network that may implement W-CDMA, network 110c is a CDMA network that may implement CDMA2000 1X or HRPD, and network 110d is an IEEE 802.11 network. The IEEE 802.11 network may implement any standard in the IEEE 802.11 family of standards such as 802.11a, 802.11b, 802.11g, 802.11n, etc. In the description herein, "802.11" generically covers any standard in the IEEE 802.11 family of standards.

A multi-mode terminal 120 may be capable of communicating with wireless networks of different radio technologies. For example, terminal 120 may support GSM, W-CDMA, CDMA 1X, HRPD, 802.11, etc., or any combination thereof. Terminal 120 may be stationary or mobile and may also be referred to as a user equipment (UE), a mobile station, an access terminal, a mobile equipment, a subscriber unit, a station, etc. Terminal 120 may be a cellular phone, a personal digital assistant (PDA), a wireless device, a wireless modem, a handheld device, a laptop computer, a cordless phone, etc.

Terminal 120 may be located in area 114 and may be able to receive GSM network 110a, UMTS network 110b, and CDMA network 110c. However, terminal 120 may prefer to use UMTS over both GSM and CDMA, e.g., for better service and/or greater coverage. For terminal 120, there may be preferences for different network operators and their associated services. For example, the operator for network 110a may be preferred over the operator for network 110b, which may be preferred over the operator for network 110c. However, taking into account both radio technology and network operator preferences, terminal 120 may prefer UMTS network 110b over both GSM network 110a and CDMA network 110c. Terminal 120 may thus have a prioritized list of preferred network operator and technology combinations. In general, a prioritized list may be formed on the basis of network operator preferences, radio technology preferences, both network operator and radio technology preferences, etc.

Terminal 120 may be able to receive multiple wireless networks of different radio technologies at a particular location. However, there may be only one or few preferred network operators for terminal 120 among all of the available networks. Terminal 120 may perform a search in order to find a preferred network operator and/or a preferred radio technology. For the search, terminal 120 may tune its receiver to each frequency that might be used by a wireless network and determine whether any wireless network is operating on that frequency. For each frequency, terminal 120 may detect for a signal from a wireless network at that frequency, acquire timing and/or frequency of any detected signal, demodulate broadcast information from any acquired signal, identify the wireless network operator based on the broadcast information, and decide whether or not to select the wireless network. The network search for each radio technology may be performed in accordance with a procedure applicable for that radio technology.

Terminal 120 may have a list of preferred network operators or a list of preferred network operator-technology combinations. The entries in the preferred list may be prioritized to ensure that terminal 120 selects the home network operator when in range and, when roaming, selects certain other network operators that the home network operator may have business arrangements with and/or offer advantages to the home network operator and/or the terminal user. Terminal 120 then may perform a full search in order to identify all preferred network operators or all network operator-technology combinations that may be available at the current location. Terminal 120 may then select the most preferred network operator or network operator-technology combination for use.

Terminal 120 may spend a long time to acquire a preferred network, e.g., when the terminal is powered on at a new location (e.g., following a plane flight) or loses coverage (e.g., going through a long tunnel) and needs to re-acquire coverage at a different location. In many cases, the wireless network that terminal 120 used previously may not be available, and terminal 120 may have little or no knowledge of the networks available at the new location. Terminal 120 may perform a full search in order to detect all available networks. During the full search, the user may not be able to invoke or receive any services.

Terminal 120 may search for a preferred network at power up or upon loss of coverage. Terminal 120 may also search for a more preferred network when receiving service from either a less preferred network or a non-preferred network, which may have been selected initially because a more preferred network was not available at a previous location. It is desirable to quickly find a preferred network in all of these scenarios.

In an aspect, terminal 120 may store information for cells and/or wireless networks and may use the stored information to more quickly and efficiently perform network selection. Terminal 120 may store information for only preferred networks, or any available networks, or preferred networks plus available networks wherever preferred networks are not available, or some other combination of networks. In the following description, a "recorded" network is a wireless network that terminal 120 has stored information for, which may be used for network selection. A recorded network may be a preferred network or an available network, which may have been previously detected or accessed by terminal 120.

In general, terminal 120 may store any type of information for a given network. For example, terminal 120 may store information used to acquire the network such as, e.g., frequency band, frequency channel, radio technology, scrambling code, etc. Terminal 120 may also store information regarding where the network might be detected, the likelihood of detecting the network, etc. Terminal 120 may update the stored information as new networks are discovered and/or as new coverage area or capabilities for the recorded networks are identified. Terminal 120 may be able to obtain a comprehensive database for cells and/or networks over time via the self-learning capability.

Terminal 120 may perform network selection at a particular time and may be unaware of which wireless networks may be available, e.g., because terminal 120 has powered on at a new location. Terminal 120 may then search for a preferred network based on the stored information. For example, terminal 120 may search for preferred network operators or combinations of network operators and radio technologies in a prioritized order. Terminal 120 may use the stored information to determine which frequency band(s) and radio technology to attempt acquisition for a given preferred network.

In one design, terminal 120 may store usage information for wireless networks previously accessed by the terminal. Terminal 120 may store information on the degree of usage (e.g., aggregate access time) for each frequency band and radio technology used by each recorded network and/or other network usage statistics. The usage information may be used to determine which networks are normally available over a period of time. A higher degree of prior usage for a given network may be indicative of greater likelihood of acquiring that network in the future. Terminal 120 may determine a search order based on the usage information and may search for one or more networks in frequency bands and radio technologies having higher levels of prior usage.

In another design, terminal 120 may store past availability information for networks previously detected but not accessed by the terminal. Terminal 120 may store information on the percentage of time and/or the number of times each network was detected and/or other availability statistics. Greater prior availability for a given network may be indicative of greater likelihood of detecting that network in the future.

In yet another design, terminal 120 may store coverage information for networks previously detected by the terminal. The coverage information may indicate where these networks were detected previously by terminal 120 and may be provided in various formats. In a first scheme, the coverage information may comprise geographic description (e.g., latitude and longitude coordinates) of specific locations where each network was detected. Terminal 120 may store information such as the identity of each network, radio technology and frequency information for each network, geographic description of the locations where each network was detected, etc. Terminal 120 may store network and coverage information for all locations in which the terminal has visited. Alternatively, terminal 120 may store information for locations that may be spaced apart by at least some minimum distance (e.g., at least one kilometer), which may reduce the amount of coverage information to store. Terminal 120 may omit information for locations in which the terminal was present for only brief periods of time (e.g., when the terminal user was moving) in order to further reduce storage. For areas in which terminal 120 was present for extended periods of time (e.g., home, home neighborhood, work place, preferred shopping areas, homes of friends and relatives, etc.), terminal 120 may store information on a denser basis for locations that may be more closely spaced together.

In a second scheme, the coverage information may comprise geographic description of a visited coverage area where each network was previously detected by terminal 120. A visited coverage area of a network is a portion of the coverage area of the network that was visited by terminal 120. This scheme may allow terminal 120 to consolidate coverage information for networks in order to reduce both storage space and processing time to search through the stored information. The coverage information for a network may comprise location coordinates along the perimeter of the visited coverage area for that network. Alternatively, terminal 120 may approximate the visited coverage area with a geometric shape such as a circle, an ellipse, an n-sided polygon, etc. For example, the visited coverage area may be approximated with (i) a circle defined by a center and a radius or (ii) an ellipse defined by a center, the lengths of the minor and major axes, and the bearing of the major axis. Terminal 120 may select an appropriate geometric shape and/or determine parameters of the selected geometric shape based on location coordinates obtained for the network. The coverage information may also be given in other geographic shapes and formats.

Terminal 120 may store coverage information for recorded networks in various manners. Terminal 120 may store coverage information and associate detected networks to the coverage information. For example, terminal 120 may store different coverage areas (e.g., geographic shapes) and a set of networks detected in each coverage area. The networks in the set associated with a particular coverage area may be given in an order of preference. A new coverage area may be defined whenever a different set of networks is detected in the area. Alternatively, terminal 120 may store a list of detected networks and the coverage area for each network in the list. The coverage area for each network may be given by one or more geographic shapes, a set of location coordinates, etc. Terminal 120 may update the visited coverage area for each network as appropriate.

Terminal 120 may use the coverage information for the previously detected networks to efficiently perform network selection. Terminal 120 may determine its current location based on any positioning method, e.g., a standalone positioning method that is independent of wireless network support, such as Global Positioning System (GPS). For the first scheme, terminal 120 may determine the closest previously visited location for which stored information for networks is available. Terminal 120 may retrieve the stored information for the networks detected at this closest location and may search for these networks in a suitable order so that a preferred network may be found as quickly as possible. For the second scheme, terminal 120 may first determine its current location and then determine whether the current location is within the visited coverage area for any previously detected network. Terminal 120 may identify networks with coverage overlapping the current location and may search for these networks in a desired order.

Terminal 120 may also use information broadcast by wireless networks for network selection. For example, base stations (or access points) in a wireless network may broadcast their location coordinates. Terminal 120 may ascertain the locations of these base stations based on the broadcast information. Terminal 120 may then ascertain its location based on the locations of all received base stations and may identify networks available at this location based on the stored information. Terminal 120 may also use the information broadcast by the base stations to assist with storing information for networks detected at each location, e.g., if terminal 120 could not or preferred not to derive its location by other means due to cost or other reasons.

Figure 2:
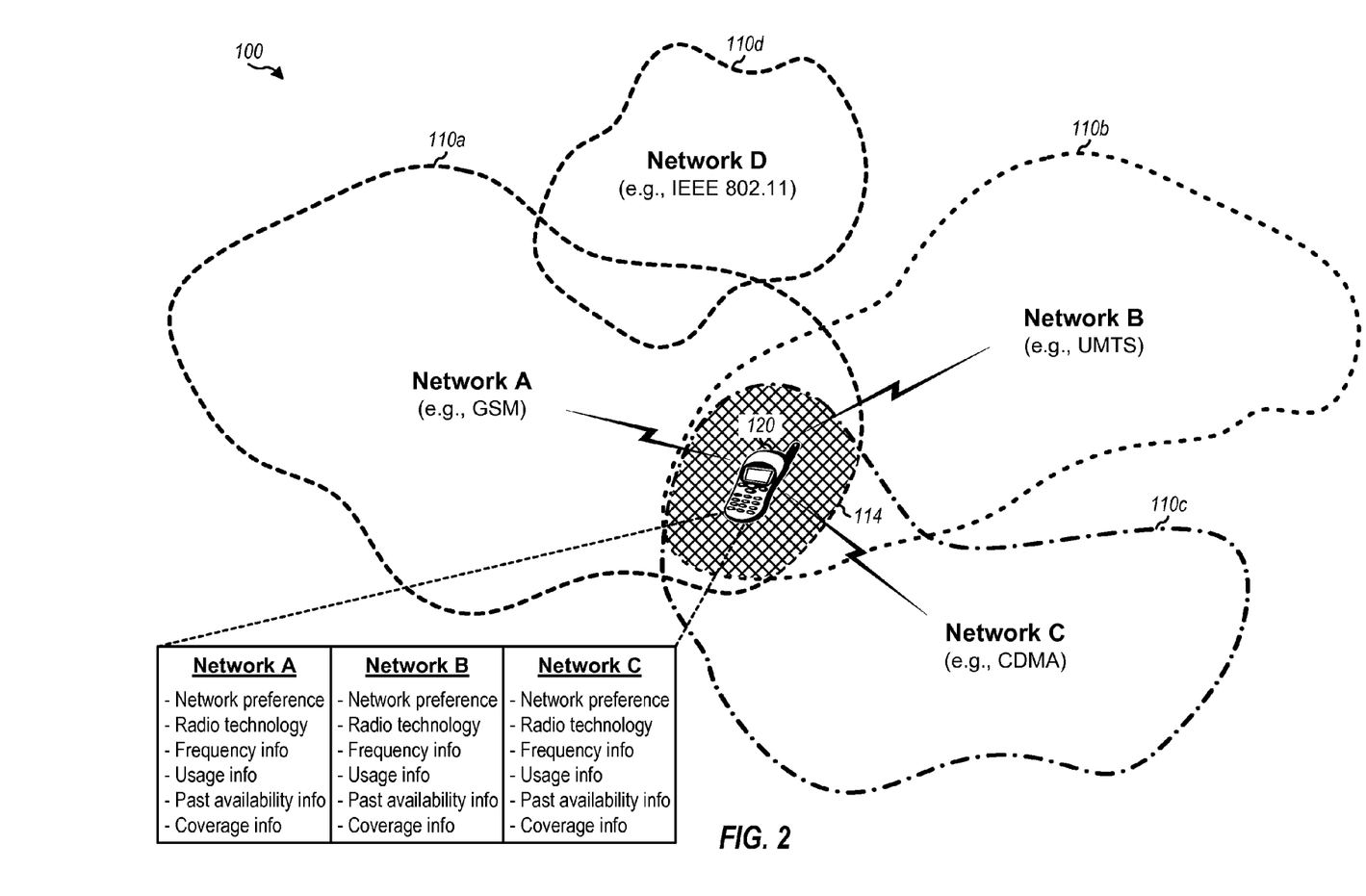
FIG. 2 shows use of stored information to expedite network selection.

FIG. 2 shows a design of using stored information to expedite network selection. Table 1 lists some types of information that may be stored by terminal 120 for each network and provides a short description for each type of information.

TABLE 1

| Information Type | Description |
| --- | --- |
| Network preference | Indicate the preference of a wireless network. |
| Radio technology | Indicate radio technology used by the wireless network. |
| Frequency information | Indicate frequency band(s) and/or frequency channel(s) used by the wireless network. |
| Usage information | Indicate degree or extent of prior use of the wireless network. |
| Past availability information | Indicate past availability of the wireless network. |
| Coverage information | Indicate where the wireless network may be detected. |

Table 1 lists different types of information that may be stored for each network. Different and/or other types of information may also be stored. For example, terminal 120 may store only usage information, only past availability information, only coverage information, both usage and coverage information, etc.

The information in Table 1 may be maintained for a given network as follows. The preference of the network may be given based on a scale of 1 to N, with 1 being the most preferred and N being the least preferred, where N may be any value. The preference may be defined by the home network operator and provisioned at terminal 120. The frequency information may indicate one or more frequency bands, one or more frequency channels, one or more broadcast channels, etc., used by the wireless network and may be updated as new frequency bands and/or channels are discovered for the wireless network. Terminal 120 may use the radio technology and frequency information to search for the wireless network. The usage information may indicate how often the wireless network was accessed in the past and may be updated whenever the wireless network is selected for use. The past availability information may indicate how often the wireless network was detected in the past and may be updated whenever the wireless network is detected. The coverage information may convey the visited coverage area for the wireless network and may be updated whenever the terminal moves to a new area.

Terminal 120 may maintain a table for the stored information. In one design, the table may include an entry for each wireless network previously detected or accessed by terminal 120. A new entry may be added in the table when a new network is found by terminal 120. The entry for each network may include fields for different types of information, e.g., as shown in Table 1. Each field for each network may be updated as new information is gathered for that network.

In yet another design, terminal 120 may store information for cells as well as networks previously detected by the terminal. The term "cell" may refer to a base station (or an access point) and/or its coverage area depending on the context in which the term is used. A base station coverage area may be partitioned into multiple smaller areas that may be referred to as sectors or cell-sectors. For simplicity, much of the following description assumes that networks are not sectorized and that cells are the smallest unit of coverage. The techniques described herein may also be used for sectorized networks in which sectors or cell-sectors are the smallest unit of coverage.

Figure 3:
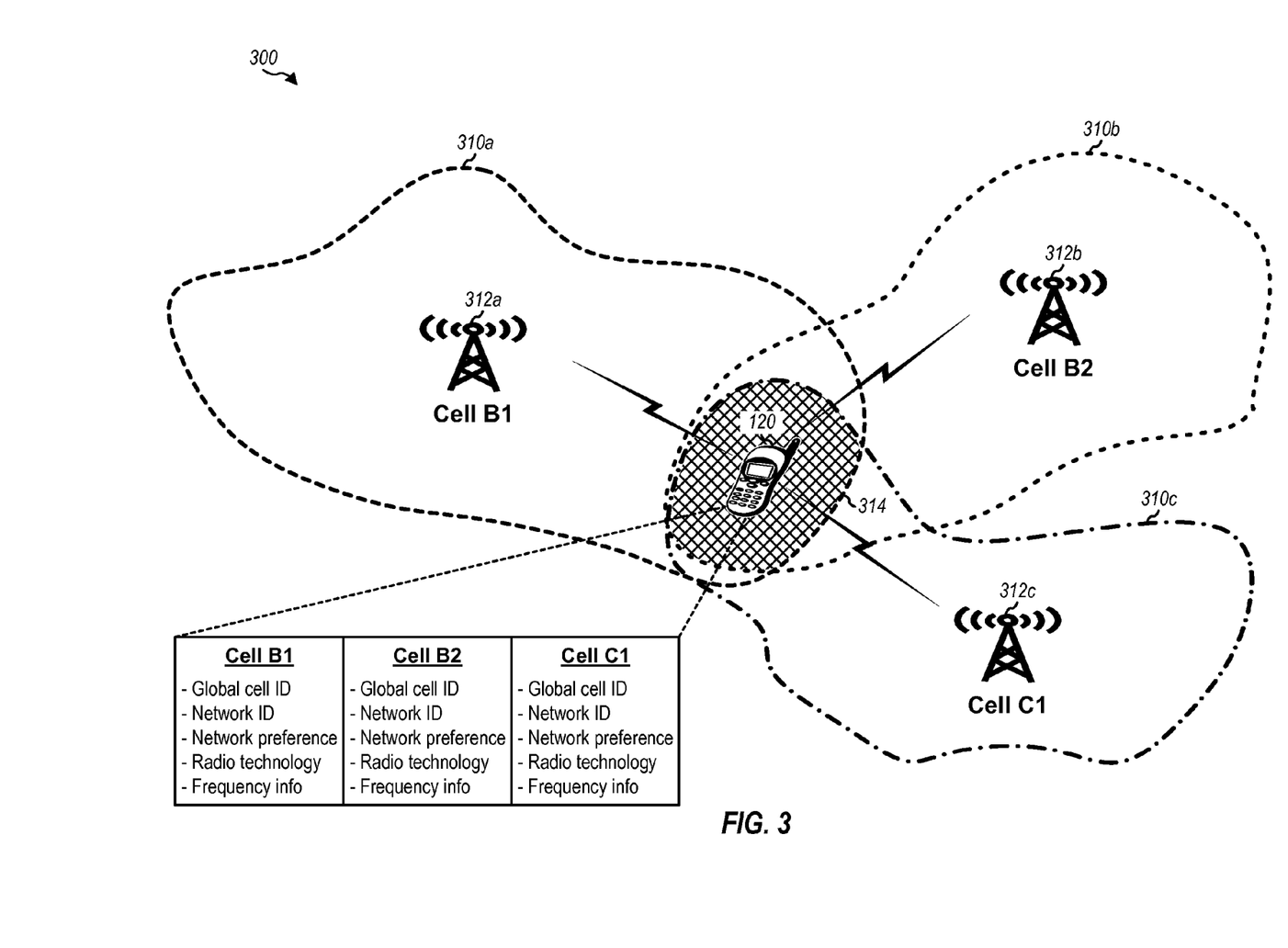
FIG. 3 shows an environment with multiple cells in different wireless networks.

FIG. 3 shows an example network environment 300 in which terminal 120 may be within the coverage of multiple cells in multiple wireless networks. In this example, terminal 120 is within the coverage of cells 310a and 310b in UMTS network 110b and also cell 310c in CDMA network 110c. Cells 310a, 310b and 310c are also denoted as cells B1, B2 and C1, respectively, and are served by base stations 312a, 312b and 312c, respectively. Cells B1, B2 and C1 overlap in area 314, which is shown with cross hashing in FIG. 3.

Terminal 120 may store identification information for cells detected at a particular location. The identification information for each cell may be obtained from, and may be associated with, the transmission from a base station, an access point, a repeater, etc. The cell identification information may be globally unique identification and may be given in different formats for different radio technologies. For example, the identification information for a cell in GSM or UMTS may comprise a mobile country code (MCC), a mobile network code (MNC), a location area code (LAC), and a cell identity (CI). The identification information for a sector in CDMA 1X may comprise a system identification (SID), a network identification (NID), and a BaseID, which may be composed of a CELL_ID and a SECTOR_ID. The identification information for a sector in HRPD may comprise a 128-bit subnet-ID. The identification information for an access point in an IEEE 802.11 network may comprise a Medium Access Control (MAC) address assigned to the access point and used to identify its coverage area. The globally unique identification for each cell may be broadcast by the base station and/or repeater serving that cell. Similarly, each access point may broadcast its MAC address in beacon frames. Terminal 120 may receive the globally unique identification for a given cell whenever the terminal comes within the coverage of the base station or repeater for that cell. Terminal may also receive the MAC address of a given access point whenever the terminal comes within the coverage of that access point. The identification information for a given cell, sector, or access point may also be referred to as a global cell identity (G_ID).

Terminal 120 may also store other information for each detected cell. For example, for each detected cell, terminal 120 may store a network identity (network ID) for the wireless network to which the cell belongs if this network ID is not contained in or implied by the cell identification information, the preference or priority of the wireless network or the combination of network and radio technology, frequency information for the cell, radio technology used by the cell, etc. Terminal 120 may store information for each detected cell only once, if possible, in order to reduce the amount of information to store for cells detected at different locations.

For each detected cell, terminal 120 may store information for other associated cells and/or networks that were also detected by terminal 120 within the visited coverage area of this cell. The stored information may include the radio technology and frequency information for each network, the preference or priority of the network, the identities of the associated cells, etc. Terminal 120 may also store signal strength information for cells and/or networks. For example, terminal 120 may flag cells with weak received signal strength and/or networks with weak received cells. The information may be collected and updated at all or some locations, on a continuous time basis or at discrete time intervals, whenever cells are detected by terminal 120 or when the received signal strength for cells exceeds a particular threshold.

A cell may have a certain normal coverage area in which its received signal strength will normally be high and in which the cell may be accessed in order to receive service from its associated network. The cell may also have an extended coverage area (e.g., an area surrounding the normal coverage area) in which the cell may be detected by terminal 120 but, due to lower signal strength, may not be able to effectively serve the terminal. In associating cells from different networks, terminal 120 may employ both the normal and extended coverage areas of each cell in order to increase the number of other cells associated with that cell. In this case, the signal strengths of the associated cells for a given cell may not always be high and, throughout the normal or extended coverage area of that given cell, the signal strength of an associated cell may be consistently high or consistently low or may vary between low and high values at different locations. Such signal strength information may also be stored for each cell associated with any given cell.

Terminal 120 may also store association between signal strengths for cells. For example, the signal strength or signal strength range for a given associated cell may be stored for any cell for locations at which the associated cell's signal strength is high (e.g., in the normal coverage area of the associated cell) and separately for other locations where the associated cell's signal strength is low (e.g., in the extended coverage area of the associated cell). Terminal 120 may later detect a particular cell and obtain the cell's signal strength at its current location. Terminal 120 may then determine, based on both the cell identity and signal strength, which other cells may be acquired at its current location and which of these cells have higher signal strengths and thus will be more likely to be usable. Based on the preference order for the networks associated with the cells with higher signal strength, terminal 120 may attempt to acquire the cell with the highest network preference first and, if not acquired, may attempt to acquire other cells according to the network preference order.

The stored information for the cells and/or networks may be linked such that terminal 120 can quickly identify all cells that might be received whenever a given cell is detected. For each detected cell (or access point), information for that detected cell and/or its network may be linked to other cells and/or networks that might also be received. This linking of information may also reduce storage of duplicate information for cells and/or networks. If more than one cell in a given network can be detected at a particular location, then terminal 120 may store the strongest detected cell, or a set of strongest cells, or all detected cells together with an indication of their relative received signal strengths. The storage process may be repeated (e.g., at other locations) whenever changes are observed in the detected cells.

Terminal 120 may reduce storage of information by omitting cells that were detected for only short periods of time. Terminal 120 may move through an area when these cells were detected and may be less likely to return to these cells for any significant amount of time. Terminal 120 may also note cells found through an extensive search. For example, the user may power on terminal 120 when arriving at an airport, and an extensive search may be performed to acquire a preferred network. Terminal 120 may store more information in this case and may use this information to expedite network selection on the next visit to the same airport.

Terminal 120 may use the stored cell information for network selection. Terminal 120 may revisit or come near a location where cells were previously detected and information was stored for these cells. Terminal 120 may detect a cell at this location, receive and decode broadcast information from this detected cell, identify the detected cell based on the broadcast information, and determine other cells and networks (if any) associated with the detected cell and for which stored information is available. Terminal 120 may then determine a suitable order for searching for wireless networks indicated by the stored information as being available at this location. The search order may be determined based on the preferences or priorities of the wireless networks, as indicated by the stored information. Terminal 120 may then search for one wireless network at a time, starting with the most preferred network. For each wireless network, terminal 120 may search for any cell in the network or for specific cells identified by the stored information.

In the example shown in FIG. 3, terminal 120 may first detect cell B1 in network B while in area 314 and may determine that cells B2 and C1 in networks B and C, respectively, might also be received at this location based on the stored information linking cell B1 with cells B2 and C1. Terminal 120 may then determine the desired order for searching for networks B and C. Terminal 120 may attempt acquisition of network C first and may search for either any cell in network C (e.g., using the radio technology and frequency information stored for network C) or a specific cell C1 that is associated with the first detected cell B1.

Terminal 120 may detect a given cell x in multiple locations and may store information associating cell x with multiple sets of other cells available at these locations and their networks. Terminal 120 may thereafter revisit one of these multiple locations and detect cell x first. Terminal 120 may then obtain the multiple sets of cells associated with the first detected cell x, combine these sets of cells and their networks, and search through the combined cells and/or networks in a desired order. Alternatively, terminal 120 may make use of information on signal strength for the associated cells (if previously stored) and search for cells with the highest recorded signal strength. In yet another alternative, terminal 120 may detect one of the cells (cell y) associated with cell x. Terminal 120 may then obtain other cells associated with the second detected cell y and their networks from the stored information. Terminal 120 may then search first (or only) for cells or networks that are associated with both cells x and y.

In general, terminal 120 may initially detect any number of cells, determine other cells associated with each detected cell, and search first (or only) for cells or networks that are associated with all initially detected cells or the greatest number of initially detected cells. If multiple cells are initially detected, then terminal 120 may combine the information for the networks for all detected cells to determine a smaller or larger set of available networks from which to perform network selection. Terminal 120 may obtain (i) a larger set based on a union of the networks associated with the initially detected cells or (ii) a smaller set based on an intersection of these networks. Terminal 120 may also select networks more likely to be available based on other criteria, e.g., the received signal strength and recorded signal strength for these networks, usage information, past availability information, etc.

Tables 2 to 5 provide an example of cell information that may be stored by terminal 120. In this example, cells in three wireless networks were detected by terminal 120 while operating in a small area. The specific values in these tables are purely for illustrative purposes and may not correspond to any actual networks.

Table 2 stores information for the three wireless networks detected by terminal 120. The information stored in Table 2 may be common for all cells in each network. In this example, Table 2 stores, for each network, an internal identifier (e.g., A) for the network, an external global identity (e.g., MCC and MNC) assigned to the network, the preference of the network, the frequency band and radio technology used by the network, and a pointer to a network-specific table for that network. As an example, for network A, the MCC-MNC is 200-56, the preference is 1 (meaning network A is the most preferred network), the frequency band is 1900 MHz, the radio technology is GSM, and Table 3 stores the cell information for network A. Terminal 120 may create the internal network identifier in order to facilitate any layered reference to the information in Table 2. The external global identity for each network may be obtained from information broadcast by each cell in that network. The network-specific table for each network may store information for each cell previously detected in that network.

TABLE 2

Network Information

| Network | MCC-MNC | Preference | Frequency Band | Radio Technology | Pointer to Network Table |
|---|---|---|---|---|---|
| A | 200-56 | 1 | 1900 MHz | GSM | Pointer to Table 3 |
| B | 200-76 | 2 | 850 MHz | W-CDMA | Pointer to Table 4 |
| C | 200-49 | 3 | 1900 MHz | CDMA | Pointer to Table 5 |

Tables 3, 4 and 5 store cell information for networks A, B and C, respectively. In this example, each table stores, for each cell, an internal identity (e.g., A1) for the cell, an external identity for the cell, a frequency channel for the cell, the network to which the cell belongs, and internal identities of other cells in the same or other networks having overlapping coverage with this cell. The internal cell identity may be used as a pointer to the table entry for the cell. The external identity of each cell may be obtained from information broadcast by that cell. The frequency channel is indicative of the frequency used by the cell and may be given by an absolute radio frequency channel number (ARFCN) in GSM, an UTRA ARFCN (UARFCN) in W-CDMA, a channel number in CDMA, etc. Each table may also store other information that may be specific to a particular radio technology. For example, Tables 4 and 5 may store scrambling code information for W-CDMA and CDMA, respectively.

As an example, in Table 3, a cell with internal identity A1 was detected previously by terminal 120. The external identity of cell A1 is given by a Location Area Code (LAC) of 230 and a Cell Identity (CI) of 120. Cell A1 broadcasts on channel 960 and belongs to network A. Cell A1 is associated with cell A2 in network A and cell C2 in network C. The associated cells A2 and C2 may be detected by terminal 120 when within the coverage of cell A1.

TABLE 3

Cell Information for Network A

| Cell | LAC-CI | Channel | Network | Associated Cells |
|---|---|---|---|---|
| A1 | 230-120 | 960 | A | A2, C2 |
| A2 | 230-121 | 900 | A | A1, C2 |
| A3 | 230-122 | 700 | A | B3, C3 |

TABLE 4

Cell Information for Network B

| Cell | LAC-CI | Channel | Network | Associated Cells |
|---|---|---|---|---|
| B1 | 232-24 | 800 | B | B2, C1 |
| B2 | 232-25 | 750 | B | B1, C1 |
| B3 | 232-26 | 650 | B | A3, C3 |

TABLE 5

Cell Information for Network C

| Cell | LAC-CI | Channel | Network | Associated Cells |
|---|---|---|---|---|
| C1 | 25-98 | 120 | C | B1, B2 |
| C2 | 25-97 | 140 | C | A1, A2 |
| C3 | 25-96 | 160 | C | A3, B3 |

The network and cell information in Tables 2 to 5 may also be stored in other manners. For example, a single table may have one entry per cell, with each entry containing the internal and external cell identities, the external network identity, the frequency band and channel number, and the internal identities of the associated cells in other networks. This single table may contain all of the information in Tables 2 to 5.

Terminal 120 may use the network and cell information in Tables 2 to 5 for network selection as follows. Terminal 120 may be powered on and may first detect a cell with a LAC-CI value of 25-96 in a network with an MCC-MNC value of 200-49. Terminal 120 may scan the cell-related tables for any cell with the LAC-CI value of 25-96. In this example, terminal 120 may find this LAC-CI value for cell C3 in Table 5. Terminal 120 may then verify whether the detected MCC-MNC value of 200-49 matches the MCC-MNC value for network C to which cell C1 belongs. In this example, Table 5 indicates that cell C1 belongs in network C, and Table 2 indicates that network C has an MCC-MNC value of 200-49, which matches the detected MCC-MNC value. Terminal 120 may thus confirm that the detected cell is indeed cell C3 and may discover from Table 5 that there are two associated cells A3 and B3 with overlapping coverage with cell C3.

By using Tables 2 and 5, terminal 120 may locate the networks for cells A3, B3 and C3 and may then ascertain their network preferences. In this example, detected cell C3 belongs in network C with preference 3, while associated cells A3 and B3 belong in networks A and B with preferences 1 and 2, respectively. Since network A has the highest preference, terminal 120 may attempt to detect cell A3 first. Tables 2 and 3 indicate that cell A3 is a GSM cell operating in the 1900 MHz band on channel 700 and assigned a LAC-CI value of 230-122. Terminal 120 may use this information to quickly acquire cell A3 without laborious searching. If cell A3 is acquired, then terminal 120 may attempt to access network A via this cell. If cell A3 is not acquired, then terminal 120 may attempt to access cell B3 in network B, which has the next highest preference. If cell B3 is not successfully acquired, then terminal 120 may fall back to the initially detected cell C3 in network C. Terminal 120 may then know, based on the absence of other associated cells in Table 5 for cell C3, that there is no need to look for any other networks.

Terminal 120 and/or other terminals may send to a network operator (e.g., the serving or home network operator) information collected by these terminals using self-learning techniques and suitable for use for network selection. For example, terminal 120 may send information for cells and/or networks previously detected in different geographic areas or locations, cells and/or networks associated with the detected cells, identities of detected cells and networks, frequencies and radio technologies used by detected networks, etc. Terminal 120 may accumulate information over some time period and send the information when appropriate. Terminal 120 may also send smaller amounts of information more frequently, e.g., information for cells and networks detected by terminal 120 at its current location. Terminal 120 may also send information when and as requested by the network operator. As a specific example, terminal 120 may send the information in Tables 2 to 5 to the network operator. The network operator may combine information received from different terminals in different locations to obtain more comprehensive information on cells and networks over a larger geographic area. The network operator may provide all or portions of this comprehensive information to individual terminals to assist with network selection.

A network operator (e.g., the serving or home network operator) may also provide information that may be used by terminal 120 for network selection. The provided information may be the same as, similar to, or more extensive, precise and reliable than the information collected by terminal 120 via the self-learning techniques. The provided information may improve network selection in locations that terminal 120 has not previously visited or for which insufficient information was previously collected and stored. The provided information may be for cells and/or networks available in different geographic areas or locations, cells and/or networks associated with different cells, identities of cells and networks, frequencies and radio technologies used by networks, etc. The provided information may be given in the formats described above (e.g., as shown in Tables 2 to 5) or some other formats.

In one design, a network operator may provide information in the form of a base station almanac (BSA) that may support other capabilities such as positioning of terminal 120. The BSA typically includes various types of information on base stations to support positioning and location services. For example, the BSA may provide, for each cell (or each base station), the geographic coordinates of a base station antenna used for that cell, the frequency band for the cell, the frequency and/or frequency hopping scheme used for broadcast and/or other channels sent by the cell, other cells in the same or other networks that may be detected within the cell, transmission timing or pilot phase differences between the cell and other cells detected within the cell etc. The broadcast channel may be acquired to obtain broadcast information that may be used to verify the identity of the cell, to make measurements for positioning, etc.

The BSA may be modified and/or extended to include information used to support network selection. The BSA may include information on cells (or base stations) available at different locations, associations between cells with overlapping coverage, identities and preferences of networks to assist with network selection, radio technology and frequency information to assist with acquisition, information to support positioning, etc. The BSA may also include information on other cells and/or networks that may be selected within the area covered by the cells included in the BSA.

Each cell may broadcast almanac information that may be received and used by the terminals within the coverage of that cell. A given cell may also send almanac information directly to a given terminal, e.g., when and as requested by the terminal. For example, almanac information may be provided to terminal 120 by a network operator (e.g., the serving or home network operator) and stored at terminal 120 for future use.

Almanac or other information used to assist with network selection may be extensive if covering all cells for all networks in a large geographic area, e.g., an entire country. The amount of almanac information to send and subsequently store may be reduced in various manners.

In one design, terminal 120 may receive only almanac information applicable for terminal 120, e.g., only almanac information for networks utilizing radio technologies and frequency bands supported by terminal 120. For example, terminal 120 may support GSM and W-CDMA and may receive only almanac information for networks utilizing GSM and W-CDMA and not for networks utilizing other radio technologies such as CDMA, IEEE 802.11, etc.

In another design, almanac information may be provided for individual cells within an area geographically close to terminal 120 and belonging to all or some networks with coverage in this area.

In another design, almanac information may be provided for groups of cells instead of individual cells. For example, almanac information may be provided for GSM location areas, which are explicitly defined and identified groups of cells. Almanac information may also be provided for many or all cells in a particular network (e.g., when these cells have the same or similar information) and may comprise a superset of information for all of these cells.

In yet another design, almanac information may be provided for networks (e.g., preferred networks) over a large area (e.g., an entire country) and not in association with cells of other networks. The almanac information may include the radio technologies supported by each network, frequency information for each network, etc. The almanac information may also be reduced by providing information for only cells or groups of cells with coverage at locations where network selection may be difficult, e.g., at major airports.

Terminal 120 and/or other terminals may also send to a network operator information collected by these terminals and suitable for use as almanac information, e.g., information for cell identities, frequencies used, observed timing or pilot phase differences between associated cells, etc. Terminal 120 may collect information for cells detected by the terminal over a period of time and may send the collected information, e.g., when convenient or requested. Terminal 120 may also send information (e.g., more frequently) for only cells detected at its current location. Terminal 120 may also send its location (or measurements used to determine its location) at which information was collected. The network operator may use the information from terminal 120 to derive the locations of base stations for the detected cells. The network operator may also combine information received from different terminals to obtain more comprehensive almanac information and may then provide the applicable portions to individual terminals to assist with network selection.

Figure 4:
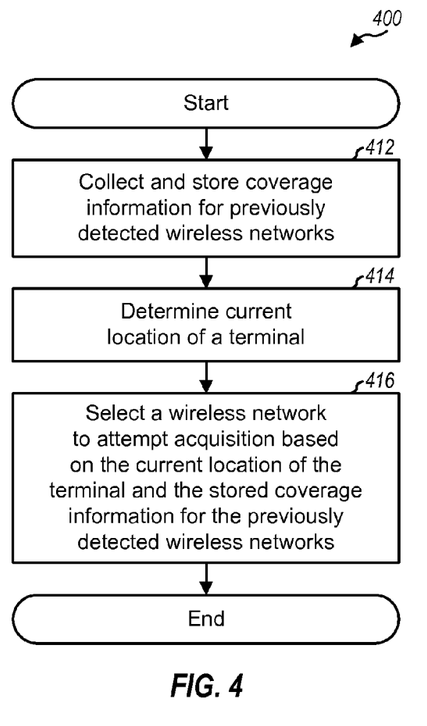
FIG. 4 shows a process for network selection using coverage information.

FIG. 4 shows a design of a process 400 performed by a terminal for network selection using coverage information. Coverage information for previously detected wireless networks may be collected by and stored at the terminal (block 412). The coverage information may be for all previously detected wireless networks, only wireless networks in a preferred list, etc. The current location of the terminal may be determined (block 414). A wireless network to attempt acquisition may be selected based on the current location of the terminal and the stored coverage information for the previously detected wireless networks (block 416).

The coverage information may comprise various types of information. For example, the coverage information for each previously detected wireless network may comprise location coordinates where the wireless network was previously detected. The location coordinates may be spaced apart by at least a particular minimum distance. For block 414, wireless networks previously detected at locations within a particular distance of the current location may be identified, and one of the identified wireless networks may be selected to attempt acquisition.

The coverage information for each previously detected wireless network may also comprise (i) a set of location coordinates defining a visited coverage area of the previously detected wireless network, (ii) a set of parameters for a geometric shape approximating the visited coverage area, or (iii) some other geographic description of the visited coverage area. For block 414, previously detected wireless networks with visited coverage areas that overlap the current location may be identified, and one of the identified wireless networks may be selected to attempt acquisition.

The coverage information for each previously detected wireless network may also comprise received signal strength measurements for cells in the wireless network. These measurements may be used to identify wireless networks available at the current location.

Figure 5:
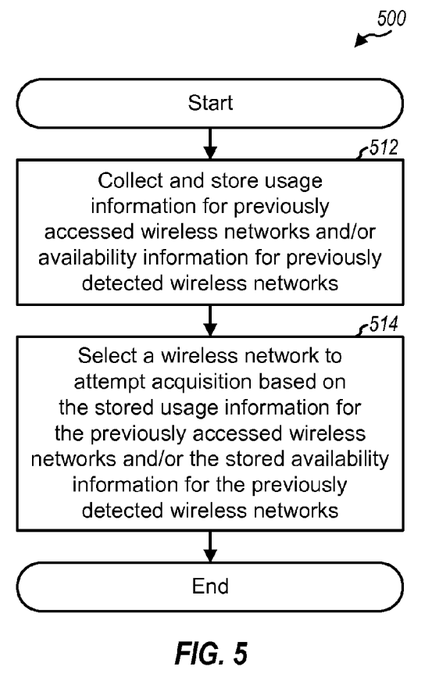
FIG. 5 shows a process for network selection using usage and/or availability information.

FIG. 5 shows a design of a process 500 performed by a terminal for network selection using usage and/or availability information. Usage information for previously accessed wireless networks and/or availability information for previously detected wireless networks may be collected by and stored at the terminal (block 512). The usage information for each previously accessed wireless network may indicate the amount of time the wireless network was previously accessed. The availability information for each previously detected wireless network may indicate the amount of time or the number of times the wireless network was previously detected.

A wireless network to attempt acquisition may be selected based on the stored usage information for the previously accessed wireless networks and/or the stored availability information for the previously detected wireless networks (block 514). For example, the wireless network that was accessed or available the most in the past may be selected for acquisition first, then the wireless network that was accessed or available the second most in the past may be selected for acquisition next, etc.

Figure 6:
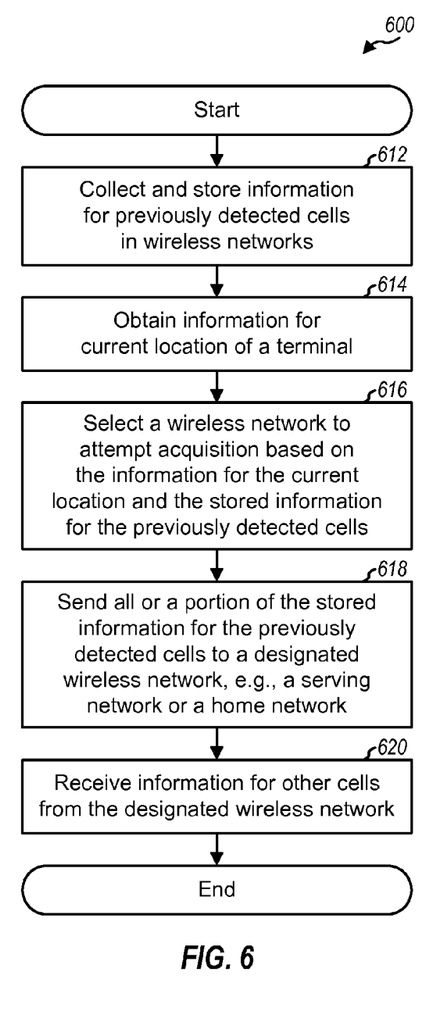
FIG. 6 shows a process for network selection using cell information.

FIG. 6 shows a design of a process 600 performed by a terminal for network selection using cell information. Information for previously detected cells in wireless networks may be collected by and stored at the terminal (block 612). Information for the current location of the terminal may be obtained (block 614). The information for the current location may comprise an identity of a cell obtained based on broadcast information received from the cell, a position estimate for the current location of the terminal, and/or some other information. A wireless network to attempt acquisition may be selected based on the information for the current location and the stored information for the previously detected cells (block 616).

The stored information for the previously detected cells may comprise radio technology and frequency information used to acquire these cells, wireless networks to which these cells belong, preferences for these wireless networks, identities of cells associated with each previously detected cell (e.g., cells that were detected at the same location as the previously detected cell), location information for each previously detected cell, and/or other information. The information may be stored in a first table of information for wireless networks (e.g., Table 2) and, for each wireless network, a second table of information for the previously detected cells in that wireless network (e.g., Table 3). The first table may store information for a network identifier, a preference, a frequency band, and a radio technology for each wireless network. The second table for each wireless network may store information for a cell identity, a frequency channel, a network identifier, and associated cells for each set of at least one previously detected cell in that wireless network. The information may also be stored in other formats, e.g., in one large table.

All or a portion of the stored information for the previously detected cells may be sent to a designated wireless network, e.g., a serving network or a home network (block 618). Information for other cells may also be received from the designated wireless network (block 620).

Figure 7:
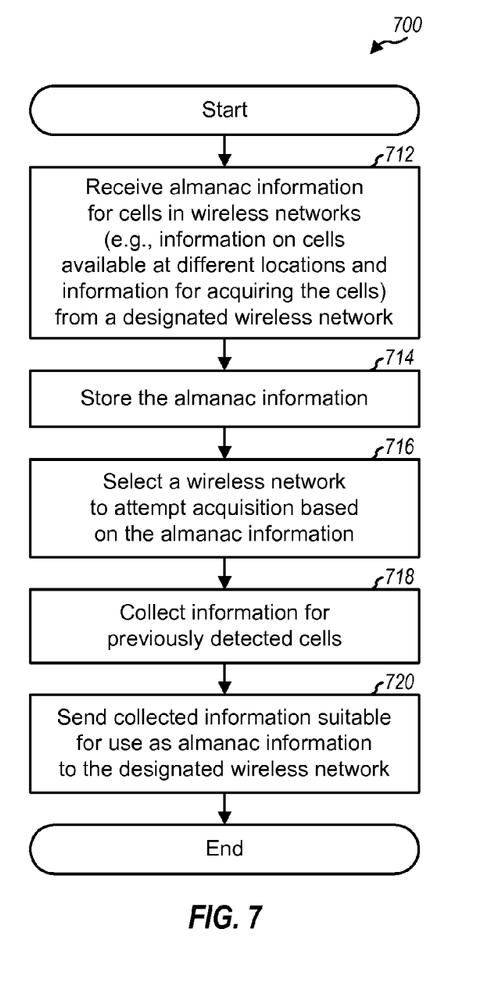
FIG. 7 shows a process for network selection using almanac information.

FIG. 7 shows a design of a process 700 performed by a terminal for network selection using almanac information. Almanac information for cells in wireless networks may be received from a designated wireless network, e.g., a serving network or a home network (block 712) and stored (block 714). The almanac information may comprise information on cells available at different locations and information for acquiring the cells. The almanac information may also comprise information linking cells with overlapping coverage and belonging in different wireless networks, information for only wireless networks utilizing radio technologies supported by the terminal, information for groups of cells instead of individual cells, information for cells in designated areas (e.g., airports), etc. A wireless network to attempt acquisition may be selected based on the almanac information (block 716). Information for previously detected cells may be collected (block 718). Collected information that is suitable for use as almanac information may be sent to the designated wireless network (block 720).

Figure 8:
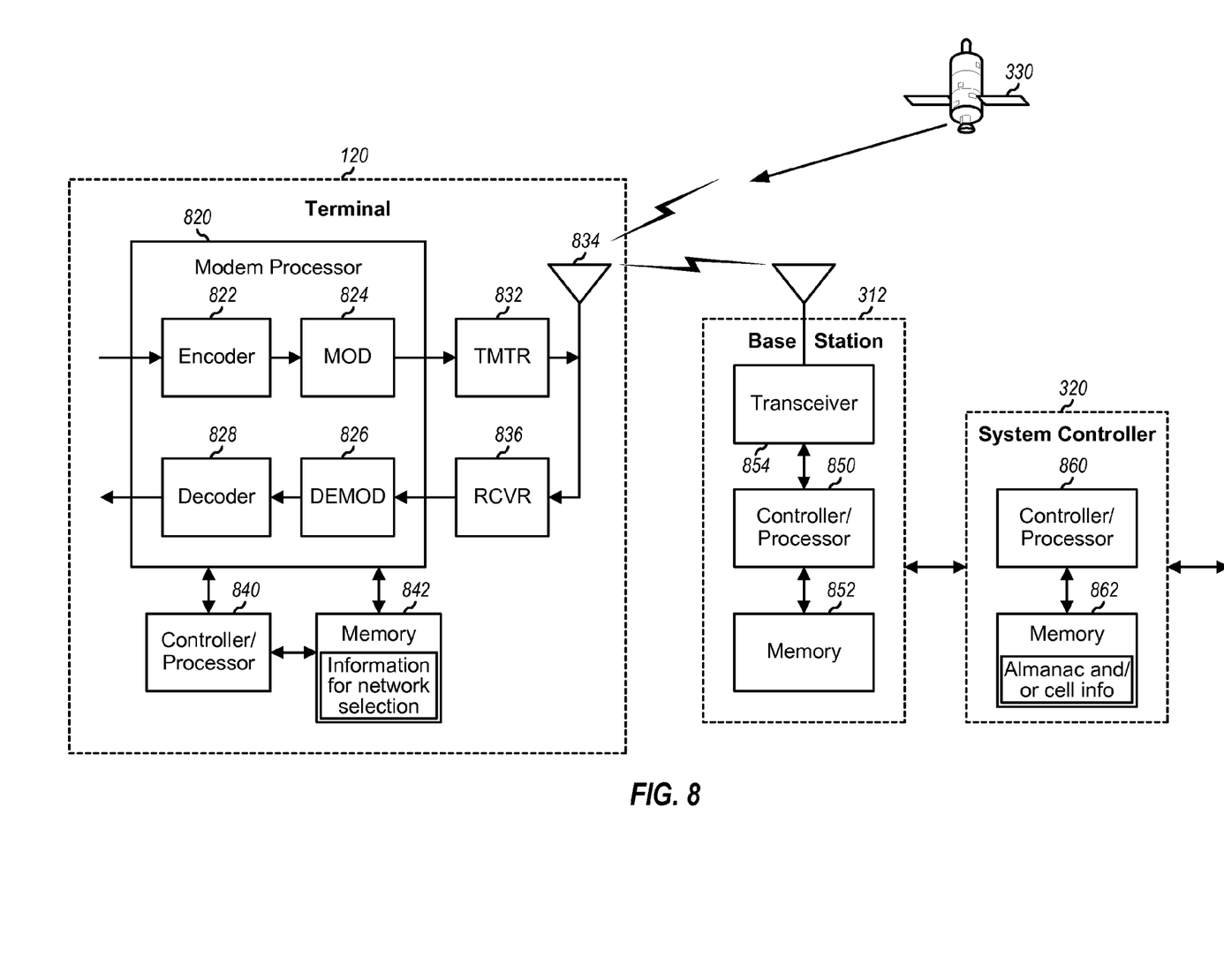
FIG. 8 shows a block diagram of a terminal, a base station, and a system controller.

FIG. 8 shows a block diagram of a design of terminal 120, a base station 312, and a system controller 320. Base station 312 may be one of the base stations in FIG. 3. System controller 320 may be a single network entity or a collection of network entities, e.g., a Radio Network Controller (RNC), a Mobile Switching Center (MSC), etc.

On the uplink or reverse link, data and signaling to be sent by terminal 120 are processed (e.g., formatted, encoded, and interleaved) by an encoder 822 and further processed (e.g., modulated, channelized, and scrambled) by a modulator (MOD) 824 to generate output chips. A transmitter (TMTR) 832 then conditions (e.g., converts to analog, filters, amplifies, and frequency upconverts) the output chips and generates an uplink signal, which is transmitted via an antenna 834. On the downlink or forward link, antenna 834 receives a downlink signal transmitted by base station 312. A receiver (RCVR) 836 conditions (e.g., filters, amplifies, frequency downconverts, and digitizes) the received signal from antenna 834 and provides samples. A demodulator (DE-MOD) 826 processes (e.g., descrambles, channelizes, and demodulates) the samples and provides symbol estimates. A decoder 828 further processes (e.g., deinterleaves and decodes) the symbol estimates and provides decoded data. Encoder 822, modulator 824, demodulator 826, and decoder 828 may be implemented by a modem processor 820. These units may perform processing in accordance with the radio technology (e.g., GSM, W-CDMA, CDMA 1X, HRPD, IEEE 802.11, etc.) utilized by the wireless network being received by terminal 120 or with which the terminal currently communicates. Terminal 120 may also receive signals from satellites 330 (e.g., GPS satellites) and may derive a position estimate for its current location based on measurements for satellites and/or base stations using a suitable positioning method.

A controller/processor 840 directs the operation at terminal 120. Controller/processor 840 may perform process 400 in FIG. 4, process 500 in FIG. 5, process 600 in FIG. 6, process 700 in FIG. 7, and/or other processes for network selection. A memory 842 stores program codes and data for terminal 120 and may also store information used for network selection.

FIG. 8 also shows a design of base station 312 and system controller 320. Base station 312 includes a controller/processor 850 that performs various functions for communication with the terminals, a memory 852 that stores program codes and data for base station 312, and a transceiver 854 that supports radio communication with the terminals. System controller 320 includes a controller/processor 860 that performs various functions to support communication for the terminals and a memory 862 that stores program codes and data for system controller 320. Controller/processor 860 may send almanac and/or information to the terminals and/or may receive almanac and/or cell information from the terminals. Memory 862 may store the almanac and/or cell information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a terminal. In the alternative, the processor and the storage medium may reside as discrete components in a terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
    a memory to store coverage information for previously detected wireless networks, wherein the coverage information for each respective previously detected wireless network is based upon location coordinates of the apparatus at which the wireless network was previously detected by the apparatus; and
    a processor to select a wireless network to attempt acquisition based on the stored coverage information for the previously detected wireless networks.

2. The apparatus of claim 1, wherein the processor determines current location of the apparatus and selects a wireless network to attempt acquisition based on the current location of the apparatus and the stored coverage information for the previously detected wireless networks.

3. The apparatus of claim 1, wherein the location coordinates are spaced apart by at least a threshold distance.

4. The apparatus of claim 1, wherein the processor determines a current location of the apparatus, identifies wireless networks previously detected at locations within a threshold distance of the current location, and selects one of the identified wireless networks to attempt acquisition.

5. The apparatus of claim 1, wherein the coverage information for each previously detected wireless network comprises a set of location coordinates of the apparatus defining a visited coverage area of the previously detected wireless network.

6. The apparatus of claim 1, wherein the coverage information for each previously detected wireless network comprises a set of parameters for a geometric shape approximating a visited coverage area of the previously detected wireless network.

7. The apparatus of claim 1, wherein the coverage information for each previously detected wireless network comprises a geographic description of a visited coverage area of the previously detected wireless network.

8. The apparatus of claim 7, wherein the processor determines a current location of the apparatus, identifies previously detected wireless networks with visited coverage areas overlapping the current location, and selects one of the identified wireless networks to attempt acquisition.

9. The apparatus of claim 1, wherein the coverage information for each previously detected wireless network comprises received signal strength for one or more cells in the previously detected wireless network.

10. The apparatus of claim 1, wherein the memory stores coverage information for previously detected wireless networks in a list of preferred networks.

11. A method of operating an apparatus, comprising:
    storing coverage information for previously detected wireless networks, wherein the coverage information for each respective previously detected wireless network is based upon location coordinates of the apparatus at which the wireless network was previously detected by the apparatus; and
    selecting a wireless network to attempt acquisition based on the stored coverage information for the previously detected wireless networks.

12. The method of claim 11, further comprising:
    determining a current location of the apparatus, and wherein the wireless network to attempt acquisition is selected based on the current location of the apparatus and the stored coverage information for the previously detected wireless networks.

13. The method of claim 11, wherein the storing coverage information for the previously detected wireless networks comprises storing a geographic description of a visited coverage area of each previously detected wireless network.

14. The method of claim 11, wherein the storing step is configured to update the coverage information based on a mobile station's detection of one or more wireless networks.

15. The method of claim 11, wherein the previously detected wireless networks for which the coverage information is stored based on the location coordinates correspond to less than all wireless networks that were previously detected by the apparatus.

16. An apparatus comprising:
   means for storing coverage information for previously detected wireless networks, wherein the coverage information for each respective previously detected wireless network is based upon location coordinates of the apparatus at which the wireless network was previously detected by the apparatus; and
   means for selecting a wireless network to attempt acquisition based on the stored coverage information for the previously detected wireless networks.

17. The apparatus of claim 16, further comprising:
   means for determining a current location of the apparatus, and wherein the means for selecting a wireless network to attempt acquisition selects the wireless network to attempt acquisition based on the current location of the apparatus and the stored coverage information for the previously detected wireless networks.

18. A non-transitory processor-readable media for storing instructions to cause an apparatus to:
   direct storage of coverage information for previously detected wireless networks, wherein the coverage information for each respective previously detected wireless network is based upon location coordinates of the apparatus at which the wireless network was previously detected by the apparatus; and
   select a wireless network to attempt acquisition based on the stored coverage information for the previously detected wireless networks.

19. The non-transitory processor-readable media of claim 18, further for storing instructions to:
   determine a current location of the apparatus, wherein the wireless network to attempt acquisition is selected based on the current location of the apparatus and the stored coverage information for the previously detected wireless networks.

20. An apparatus comprising:
   a memory to store information for previously detected cells in wireless networks, wherein the stored information for the previously detected cells is based upon previous detections of the previously detected cells by the apparatus; and
   a processor to obtain information for current location and to select a wireless network to attempt acquisition based on the information for the current location and the stored information for the previously detected cells.

21. The apparatus of claim 20, wherein the processor receives broadcast information from a cell and obtains an identity of the cell based on the broadcast information, the cell identity being the information for the current location.

22. The apparatus of claim 20, wherein the processor obtains a position estimate for the apparatus, the position estimate being the information for the current location.

23. The apparatus of claim 20, wherein the stored information for each previously detected cell comprises identities of cells associated with the previously detected cell.

24. The apparatus of claim 23, wherein the cells associated with the previously detected cell were receivable when the previously detected cell was received.

25. The apparatus of claim 20, wherein the stored information for the previously detected cells comprises wireless networks to which the previously detected cells belong and preferences of the wireless networks.

26. The apparatus of claim 20, wherein the stored information for the previously detected cells comprises radio technology and frequency information used to acquire the previously detected cells.

27. The apparatus of claim 20, wherein the memory stores a first table of information for the wireless networks and, for each wireless network, a second table of information for previously detected cells in the wireless network.

28. The apparatus of claim 27, wherein the first table stores information for at least one of a network identifier, a preference, a frequency band, and a radio technology for each wireless network.

29. The apparatus of claim 27, wherein the second table for each wireless network stores information for at least one of a cell identity, a frequency channel, a network identifier, and associated cells for each set of at least one previously detected cell in the wireless network.

30. The apparatus of claim 20, wherein the processor sends all or a portion of the information for the previously detected cells to a designated wireless network.

31. A method of operating an apparatus comprising:
   storing information for previously detected cells in wireless networks, wherein the stored information for the previously detected cells is based upon previous detections of the previously detected cells by the apparatus;
   obtaining information for current location; and
   selecting a wireless network to attempt acquisition based on the information for the current location and the stored information for the previously detected cells.

32. The method of claim 31, wherein the obtaining information for the current location comprises receiving broadcast information from a cell, and obtaining an identity of the cell based on the broadcast information, the cell identity being the information for the current location.

33. The method of claim 31, wherein the storing information for the previously detected cells comprises storing identities of cells associated with each previously detected cell.

34. The method of claim 31, wherein the storing information for the previously detected cells comprises storing a first table of information for the wireless networks, and storing for each wireless network a second table of information for previously detected cells in the wireless network.

35. The method of claim 31, further comprising: sending all or a portion of the information for the previously detected cells to a designated wireless network.

36. An apparatus comprising:
   means for storing information for previously detected cells in wireless networks, wherein the stored information for the previously detected cells is based upon previous detections of the previously detected cells by the apparatus;
   means for obtaining information for current location; and
   means for selecting a wireless network to attempt acquisition based on the information for the current location and the stored information for the previously detected cells.

37. The apparatus of claim 36, wherein the means for obtaining information for the current location comprises means for receiving broadcast information from a cell, and means for obtaining an identity of the cell based on the broadcast information, the cell identity being the information for the current location.

38. The apparatus of claim 36, wherein the means for storing information for the previously detected cells comprises means for storing identities of cells associated with each previously detected cell.

39. A non-transitory processor-readable media for storing instructions to cause an apparatus to:
direct storage of information for previously detected cells in wireless networks, wherein the stored information for the previously detected cells is based upon previous detections of the previously detected cells by the apparatus, obtain information for current location, and select a wireless network to attempt acquisition based on the information for the current location and the stored information for the previously detected cells.

40. The non-transitory processor-readable media of claim 39, and further for storing instructions to: receive broadcast information from a cell, and obtain an identity of the cell based on the broadcast information, the cell identity being the information for the current location.

41. An apparatus comprising:
a memory to store information for previously detected cells in wireless networks, wherein the stored information for the previously detected cells includes (i) radio technology and frequency information used to acquire the previously detected cells, (ii) wireless networks to which the previously detected cells belong, (iii) preferences for the wireless networks to which the previously detected cells belong, and/or (iv) location coordinates of the apparatus at which the previously detected cells were previously detected by the apparatus; and
a processor to select a wireless network to attempt acquisition based on the stored information for the previously detected cells, and to send all or a portion of the stored information for the previously detected cells to a designated wireless network.

42. The apparatus of claim 41, wherein the processor receives information for cells from the designated wireless network, and wherein the memory stores the received information for cells.

43. An apparatus comprising:
a memory to store availability information for previously detected wireless networks, wherein the availability information for each previously detected wireless network comprises an amount of time or the number of times the wireless network was previously detected; and
a processor to select a wireless network to attempt acquisition based on the stored availability information for the previously detected wireless networks.

44. An apparatus comprising:
a memory to selectively store almanac information for cells in wireless networks based on whether the cells utilize radio communication protocols supported by the apparatus, the almanac information comprising information for acquiring the cells and information related to the cells' locations; and
a processor to select a wireless network to attempt acquisition based on the almanac information.

45. The apparatus of claim 44, wherein the almanac information comprises information used to assist positioning.

46. The apparatus of claim 44, wherein the almanac information comprises information linking cells with overlapping coverage and belonging in different wireless networks.

47. The apparatus of claim 44, wherein the radio communication protocols supported by the apparatus include less than all of GSM, W-CDMA, CDMA and/or IEEE 802.11, such that almanac information from one or more of the radio communication protocols is omitted from storage in the memory.

48. The apparatus of claim 44, wherein the almanac information comprises information for groups of cells instead of individual cells.

49. The apparatus of claim 44, wherein the almanac information comprises information for cells in designated areas.

50. The apparatus of claim 44, wherein the processor receives the almanac information from a designated wireless network.

51. The apparatus of claim 44, wherein the processor collects information for previously detected cells and sends the collected information suitable for use as almanac information to a designated wireless network.

52. A method comprising:
selectively storing almanac information for cells in wireless networks based on whether the cells utilize radio communication protocols supported by the apparatus, the almanac information comprising information for acquiring the cells and information related to the cells' locations; and
selecting a wireless network to attempt acquisition based on the almanac information,
wherein the almanac information is received from a wireless network.

53. The method of claim 52, wherein the storing almanac information for cells comprises storing information linking cells with overlapping coverage and belonging in different wireless networks.

54. The method of claim 52, further comprising:
collecting information for previously detected cells; and
sending the collected information suitable for use as almanac information to a designated wireless network.

55. An apparatus comprising:
means for selectively storing almanac information for cells in wireless networks based on whether the cells utilize radio communication protocols supported by the apparatus, the almanac information comprising information for acquiring the cells and information related to the cells' locations; and
means for selecting a wireless network to attempt acquisition based on the almanac information,
wherein the almanac information is received from a wireless network.

56. The apparatus of claim 55, further comprising:
means for collecting information for previously detected cells; and
means for sending the collected information suitable for use as almanac information to a designated wireless network.

57. A non-transitory processor-readable media for storing instructions to:
direct selective storage of almanac information for cells in wireless networks based on whether the cells utilize radio communication protocols supported by the apparatus, the almanac information comprising information for acquiring the cells and information related to the cells' locations; and
select a wireless network to attempt acquisition based on the almanac information,
wherein the almanac information is received from a wireless network.

58. The non-transitory processor-readable media of claim 57, and further for storing instructions to:
collect information for previously detected cells; and
send the collected information suitable for use as almanac information to a designated wireless network.

* * * * *